Patented July 9, 1935

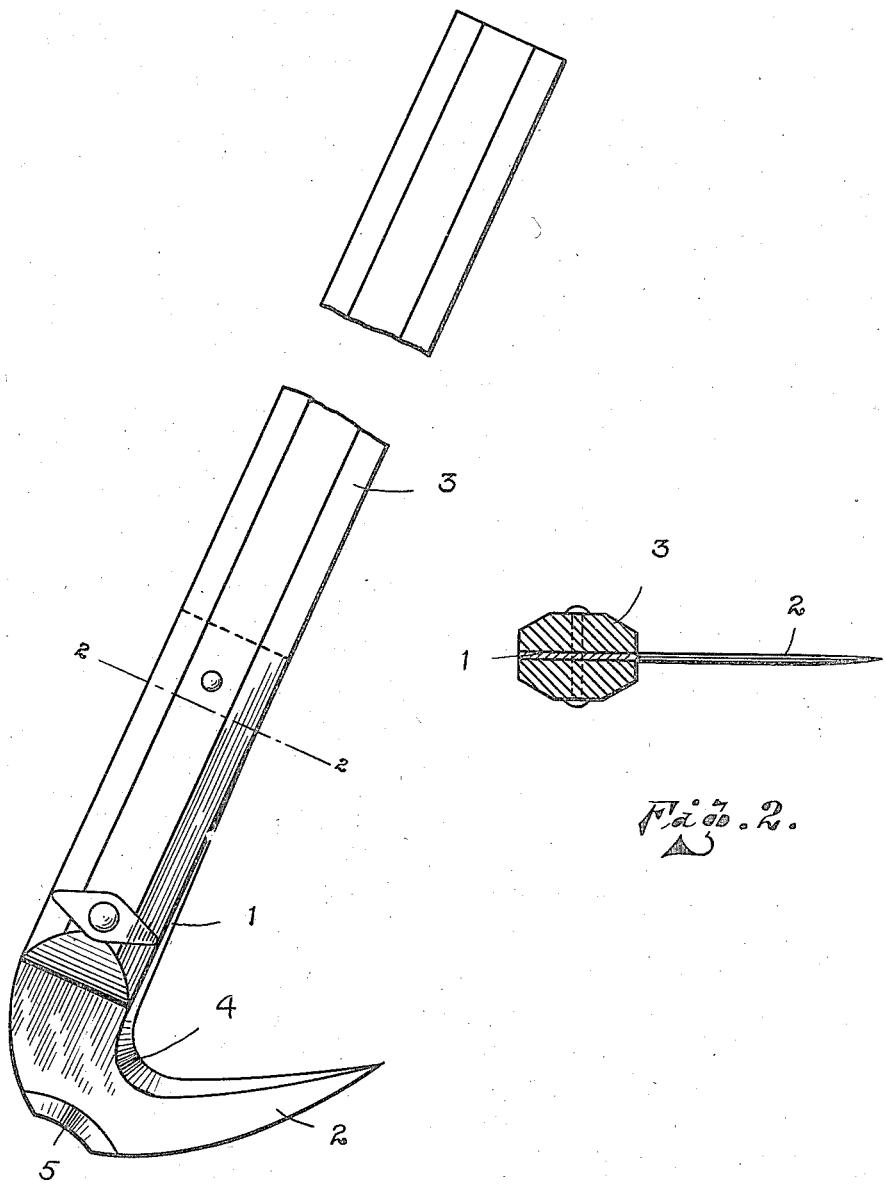

2,007,700

UNITED STATES PATENT OFFICE 2,007,700

PRUNING HOOK

Theodore Ziminski, Duluth, Minn.

Application September 16, 1933, Serial No. 689,726

1 Claim. (Cl. 30—11)

This invention relates to improvements in pruning hooks, and the principal object is to provide a more practical and efficient hook of this character.

In the drawing:

Figure 1 is a broken side elevation of a pruning hook embodying the invention, and Figure 2 is a section on the line 2—2, of Figure 1.

The invention resides in the novel form of cutting blades which is formed of a relatively thin piece of metal, being in side elevation of a generally acute angular form, though the throat of the knife is arcuate as well as the apex and forward edge thereof. The tang of the blade is illustrated at 1, while the blade itself is indicated at 2, it being of uniform thickness throughout except upon its sharpened edges. This cutting blade is conveniently assembled within a narrow saw-cut or slot made in one end of the handle 3 and securely riveted therein. The handle, obviously, may be of any shape or length desired, except that upon the end to which the blade is attached it is less in diameter or width than the base of the tang of the blade. That is to say, the tang is preferably somewhat tapered and wider than the handle and sharpened, so that the sharpened edge adjacent the throat 4 of the blade is free from obstruction by the handle to facilitate in the cutting effect when the hook is drawn obliquely against a limb, branch, or bush, and thus preventing upward slipping of the instrument on the bark of the object being severed, as the device is especially adapted for use in trimming small shrubbery or bushes such as currants, gooseberries, raspberries, or the like. The thus sharpened throat, being of acute angular form, produces an instrument ideally suited for upward inclined draft against the object to be severed, while the opposite edge, as before stated being somewhat arcuate in form to provide the necessary strength for the blade, is ideally shaped for downward thrusting of the device intermediate of and among a plurality of stalks or stems of the shrubbery being trimmed.

To further increase the adaptability of the device I have illustrated a portion of the extreme apex of the blade as being sharpened in reentrant arcuate form as at 5, thereby providing means whereby a downward thrust of the instrument may well function in the severing of for example short stubs, or broken branches, or even roots of the shrubbery being operated upon.

From the above it is apparent that I have provided an exceptionally convenient, practical and efficient pruning hook for the purpose intended.

Having thus described my invention, what I claim and desire to secure by Letters Patent, is:

A pruning hook composed of a handle and a blade, the handle being approximately octagonal in cross-section and split centrally at its lower end to accommodate the blade, the blade being composed of a thin piece of metal substantially L-shape in contour and forming a shank to be inserted in the kerf of the split handle and a hook, the shank gradually widening from its innermost end to the hook portion and extending beyond the side of the handle and being provided with a cutting edge on that portion projecting beyond the side of the handle in the direction of the hook, the hook being integral with the shank and projecting therefrom at less than a right angle and terminating in a point, the inner edge of the hook being provided with a cutting edge merging into the cutting edge of the shank, the outside edges of the shank and the hook merging into each other and having approximately a semi-circular contour, a portion of which outside edges is provided with a concave recess having a cutting edge and means for rigidly connecting the shank and the handle.

THEODORE ZIMINSKI.